United States Patent [19]

Holscher et al.

[11] Patent Number: 4,818,553

[45] Date of Patent: Apr. 4, 1989

[54] BAKERY PRODUCT WITH A REDUCED FAT EDIBLE WATER IN-OIL EMULSION

[75] Inventors: Ebo J. Holscher, Fijnaart; Jacobus Dijkshoorn, Vlaardingen, both of Netherlands

[73] Assignee: Lever Brothers Company, New York, N.Y.

[21] Appl. No.: 904,726

[22] Filed: Sep. 8, 1986

[30] Foreign Application Priority Data

Sep. 12, 1985 [GB] United Kingdom ............... 8522622

[51] Int. Cl.$^4$ ........................................... A21D 13/08
[52] U.S. Cl. .................................. 426/549; 426/553; 426/602; 426/653; 426/658; 426/804
[58] Field of Search ............... 426/553, 570, 602, 658, 426/653, 549

[56] References Cited

U.S. PATENT DOCUMENTS

| | | |
|---|---|---|
| 3,782,970 | 1/1974 | Tomita et al. ...................... 426/602 |
| 3,889,005 | 6/1975 | Brammer et al. ............... 426/602 X |
| 3,914,458 | 10/1975 | Terada et al. ....................... 426/604 |
| 3,939,290 | 2/1976 | Terada et al. ....................... 426/564 |
| 4,087,564 | 5/1978 | Poot et al. .......................... 426/603 |
| 4,115,598 | 9/1978 | Moran ................................. 426/604 |
| 4,315,955 | 2/1982 | Cramer ............................... 426/585 |
| 4,396,639 | 8/1983 | Bodor et al. ....................... 426/603 |
| 4,404,231 | 9/1983 | den Hollander et al. ......... 426/602 |
| 4,521,440 | 6/1985 | Lansbergen ........................ 426/602 |
| 4,567,056 | 1/1986 | Schmidt .............................. 426/607 |
| 4,590,087 | 5/1986 | Pronk et al. ........................ 426/603 |

FOREIGN PATENT DOCUMENTS

| | | |
|---|---|---|
| 6973174 | 12/1975 | Australia . |
| 98663 | 1/1984 | European Pat. Off. . |
| 32808 | 3/1984 | European Pat. Off. . |
| 106620 | 4/1984 | European Pat. Off. . |
| 109721 | 5/1984 | European Pat. Off. . |
| 129293 | 12/1984 | European Pat. Off. . |
| 58-000842 | 1/1983 | Japan . |
| 61-104740 | 5/1986 | Japan . |
| 1120447 | 7/1968 | United Kingdom . |
| 1217395 | 12/1970 | United Kingdom . |
| 2021140 | 1/1979 | United Kingdom . |
| 2113523 | 8/1983 | United Kingdom ............... 426/602 |
| 2130232 | 5/1984 | United Kingdom . |

OTHER PUBLICATIONS

Polydextrose-Reduced Calorie Bulking Agent, Pfizer Chemical Division, 1983, pp. 5-9.

*Primary Examiner*—Donald E. Czaja
*Assistant Examiner*—Celine T. Callahan
*Attorney, Agent, or Firm*—Milton L. Honig; James J. Farrell

[57] ABSTRACT

A method for preparing bakery products, particularly cakes, is herein disclosed which involves combining an edible water-in-oil emulsion to serve as a shortening and at least one further component selected from flour, eggs, leavening agents, sugar and mixtures of these materials. The shortening comprises 15-70% of a fat phase containing a fat displaying a defined solids profile and the balance up to 100% consisting of an aqueous phase containing 5-60% by weight, based on the total emulsion, of a water-dissolved humectant which is at least one polyol.

14 Claims, No Drawings

BAKERY PRODUCT WITH A REDUCED FAT EDIBLE WATER IN-OIL EMULSION

FIELD OF THE INVENTION

The present invention relates to w/o emulsions with a reduced fat content. By reduced fat content we mean a level of fat lower than that of conventional margarines, and particularly a fat content ranging from 15–70% by weight and preferably from 25–60% by weight.

The present invention also relates to the use of said emulsions for the production of bakery products and particularly cakes.

BACKGROUND OF THE INVENTION

Fats and fat emulsions are used in cakes to impart tenderness, succulence, texture and crumb and promote increase in volume by shortening the strands of gluten and aggregates of starch, which in the absence of fat would form a tough meshwork structure; it therefore assists the leavening in the oven of the cake of non-fermented doughs, where rapid rising by means of gas from baking powder and vapour is required. Fat also acts as a foaming/whipping agent in the aeration process of batters and doughs to achieve the required volume of the baked products.

So far fat blends or emulsions containing about 16–20% water, such as margarines, have been used for producing bakery products, e.g. cakes.

In recent years, a need has arisen for low calorie bakery products and it was proposed to replace part of the fat used for producing them, by water. The amount of water which could be used was, however, limited because the batter becomes weak, aeration becomes a problem, a decrease in cake volume is observed and locally uncooked cakes are obtained.

Some recipes for bakery products, e.g. choux paste, do allow compensation for the amount of water introduced by using emulsions with a high level of water.

Cakes can also be prepared by aerating egg or egg white instead of the fat phase, in which case low fat emulsions can be used for products such as sponge cake.

Applicants have found w/o emulsions with a reduced fat content, which can be used to produce bakery products which do not display the above-mentioned drawbacks.

SUMMARY OF THE INVENTION

The invention is based on the discovery that an appropriate proportion of water-soluble humectants in the aqueous phase of the emulsions offsets the detrimental effect caused by the presence of excess of water, i.e. any amount of water exceeding about 20%, based on the total weight of the emulsion used for producing bakery products. In other words: The lack of a sufficient amount of fat (due to an excess of water) can be compensated by the presence of humectants, particularly polyols, without affecting the functionality of the emulsion and the performance of batters or doughs produced from said emulsions in a standard recipe for a particular application.

The edible w/o emulsions according to the invention comprise 15–70% of a fat phase containing a fat displaying the following fat solids profile expressed in percentages determined by Nuclear Magnetic Resonance measurements at the indicated temperatures:

$N_{5-15} = 30-70$; $N_{20} = 15-35$; $N_{30} = 2-16$; $N_{35} = 0-10$, the balance up to 100% consisting of an aqueous phase containing 5–60% by weight, based on the total emulsion, of a water-soluble humectant comprising at least one polyol.

DETAILED DESCRIPTION OF THE INVENTION

Generally speaking, the humectant is a substance which depresses the water activity of the aqueous phase. The humectant will generally effect a decrease of the water activity to a value below 0.96, and preferably ranging from 0.70–0.90.

It is believed that the effect achieved by using the humectant goes beyond the effect on the water activity.

A class of substances particularly useful as water-soluble humectants consists of polyols which are here defined as chemical substances containing 2 or more hydroxy groups. Numerous examples of polyols can be found in Chapter 29 of Advanced Organic Chemistry by Fieser & Fieser, Reinhold Publishing Corp., 1961, which is included here by way of reference.

The polyol is preferably selected from the groups consisting of glucose, fructose, mannose, galactose, talose, lactose, sucrose, maltose, maltodextrins, polydextrose, glycerol, sorbitol, propylene glycol. The aqueous phase may contain a single polyol or a mixture of polyols.

The appropriate amount of humectant, i.e. polyol, will depend on its chemical composition, on the amount of fat present in the emulsion and on the properties of the bakery product aimed at.

The appropriate amount of humectant can be assessed in each particular situation to suit the purpose in the best possible way. Preferably 10–55%, and ideally 15–40% by weight is adequate in most products. It is recommended that 10–55% by weight of humectant should be used in emulsions containing 25–65% by weight of fat, and particularly that 15–40% by weight of humectant should be used in emulsions containing 30–45% by weight of fat.

In most emulsions the ratio fat:humectant will range from 0.3 to 16. In the preferred emulsions said ratio will range from 0.4 to 7, and ideally from 0.7 to 3.

If sucrose is used as polyol, it is recommendable that the amount of sucrose should constitute less than 35% by weight, preferably less than 30% by weight, of the total emulsion. If the emulsion contains a relatively high amount of sucrose, this will restrict its utility as an ingredient replacing normal margarines or shortening in conventional non-adapted recipes. Cakes might become too sweet, cookies might become too hard. It is therefore useful to use sucrose along with a polyol which is less sweet, such as glycerol or sorbitol.

It is also possible to combine a digestible polyol with a substantially indigestible polyol. This is particularly useful when the production of low-calorie products is aimed at. An example of an indigestible polyol is polydextrose.

When polydextrose is used as polyol, it is recommendable that it should constitute less than 35% by weight, preferably less than 20% by weight, of the total amount of polyols used for producing the aqueous phase of the emulsions according to the invention. If the emulsions contain a relatively high amount of polydextrose, the specific volume and texture of cakes produced from said emulsions are poor.

The aqueous phase which may further contain usual ingredients, such as salts, proteins, emulsifiers, gelling agents, thickening agents, constitutes 30–85% by weight, preferably 35–75% by weight, of the emulsion.

It is important that the fat phase constitutes the continuous phase of the emulsion. Perfect water-continuous emulsions cannot be used satisfactorily in traditional cake preparation involving first aerating the fat (or fat emulsion) with sugar to produce an aerated cream which is subsequently mixed with eggs and flour to produce the batter.

The fat phase of the emulsion may contain a vegetable fat or a fat of animal origin including butterfat or mixtures of vegetable and animal fats. The fats can be in their natural form or be hydrogenated, interesterified or fractionated. For each particular application the most appropriate fat blends can easily be found.

Bakery fats, and particularly cake fats (or fat blends) have a plastic consistency over a fairly wide range of temperatures and generally contain up to 40% oils liquid at 10° C. (substantialy free from crystallized fat at said temperature), the remainder consisting of fats melting within a temperature range preferably varying from about 24° to about 54° C. Good examples of bakery fat blends are for instance:

| | |
|---|---|
| 1. Hydrogenated whale oil, having a melting point ranging from 44 to 46° C. | 20% |
| Hydrogenated whale oil, having a melting point of 34° C. | 30% |
| Coconut oil, having a melting point of 24° C. | 20% |
| Soybean oil | 20% |
| 2. Premier jus, having a melting point of 46° C. | 25% |
| Coconut oil, having a melting point of 24° C. | 35% |
| Soybean oil | 40% |
| 3. Hydrogenated palm oil, having a melting point of 42° C. | 25% |
| Palm oil, having a melting point of 42° C. | 30% |
| Hydrogenated groundnut oil, having a melting point of 34° C. | 20% |
| Soybean oil | 25% |
| 4. Hydrogenated groundnut oil, having a melting point of 42° C. | 25% |
| Lard, having a melting point of 38° C. | 20% |
| Oleomargarine, having a melting point of 30° C. | 35% |
| Soybean oil | 20% |
| 5. Hydrogenated groudnut oil, having a melting point of 34° C. | 70% |
| Coconut oil, having a melting point of 34° C. | 10% |
| Soybean oil | 20% |
| 6. Hydrogenated groundnut oil, having a melting point of 42° C. | 30% |
| Coconut oil, having a melting point of 24° C. | 20% |
| Palmkernel oil, having a melting point of 28° C. | 20% |
| Soybean oil | 30% |

Blends 1 and 2 are particularly suitable for soft cakes where high "creaming" power is required; blends 3, 4 and 5 for short pastry and blend 6 for general cakemaking properties.

The emulsions according to the invention further contain an emulsifier or an emulsifier system promoting the formation of fat-continuous emulsions.

The emulsifier preferably consists of monoglyceride and diglyceride. Combinations of these emulsifiers with lecithin or any other appropriate emulsifier are, of course, also possible. The choice of the appropriate emulsifer and the way of producing the emulsion will determine the nature of the emulsion.

In the present invention conditions known per se are applied, which ensure that a fat-continuous emulsion is obtained. The preparation of such emulsion is well known in the art and does not constitute a subject of the present invention.

The w/o emulsions with a reduced fat content according to the emulsion display a very good performance when used for producing bakery products, particularly cakes. The main properties measured for judging the performance of emulsion are the cake volume, its softness and its crumb structure.

Another advantage of the w/o emulsions according to the invention lies in the fact that they can be used without any restriction in the conventional recipes, i.e. conventional recipes need not be adapted because of the use of an emulsion contributing to more water than usual in the batter used for producing the bakery product, for instance a cake. In other words, the emulsion can be used by the housewife or baker in the manufacture of baked goods as if it consisted of a conventional cake shortening or margarine.

Conventional home-made cakes are usually made by either first aerating the fat phase or by aerating the total cake batter and are often produced according to the "pound cake" recipe involving the use of equal parts of flour, sugar, eggs and fat (or emulsion). When a reduced fat emulsion (w/o), i.e. an emulsion containing more than 20% water, e.g. 30–60% water, is used instead of fat or margarine, a cake of poor quality was so far obtained, either because of the excess of water introduced in the formulation or because of the reduced amount of fat. This would require an adaptation of the recipe, which is not an attractive proposition.

It was therefore a surprising observation that reduced fat emulsions so far considered unsuitable fat ingredients for replacing margarine or shortening could be used, provided an appropriate amount of humectant is incorporated in the disperse aqueous phase of said emulsions.

The reduced fat emulsions according to the invention are prepared by first mixing the humectant with water or milk used for the preparation of the aqueous phase of the emulsion to dissolve part, and preferably all, of the humectant and subsequently emulsifying the aqueous phase containing humectant with the fat phase to obtain a fat-continuous emulsion.

Batters for bakery products, particularly cakes, are preferably prepared by mixing the emulsions according to the invention, e.g. in a Hobart mixer, with the amount of sugar prescribed in the cake recipe to produce a cream to which subsequently eggs, or an egg substitute, are added while mixing is continued, followed by the prescribed amount of flour and leavening agents, such as bakery powder or yeast.

It is also possible to homogenize and aerate the emulsions according to the invention together with all the ingredients of the batter in one go.

Baking is generally carried out at about 160° C. for about one hour. The quality of the cake is determined by measuring the specific volume (ml/g) according to standard procedures (e.g. by a wooden tray filled with millet seed (levelled). This tray is then partly emptied and the cake is put into it. The tray is now refilled to the brim with millet seed and levelled. The volume of the remaining seed is determined by means of a measuring cylinder.

$$S.V. \text{ cake} = \frac{\text{Volume millet seed (in cylinder)}}{\text{weight of the cake}}$$

An S.V. of 2.2 or lower is considered poor.
An S.V. of 2.3–2.4 is just acceptable.
An S.V. of 2.5–2.6 is good.
An S.V. of 2.7 or higher is very good.

The softness of the cake crumb is assessed by measuring the compressibility under standard conditions. The higher the compressibility, the firmer the cake.

The water content of the cakes is measured by weighing cake crumb from the centre, before and after drying for 1 hour at 120° C.

The structure of the baked products can be assessed by comparison of photographs of various cake crumbs and giving a score varying from very fine (1) to very coarse (8).

The bakery products obtained according to the invention are unique in that they contain less fat than normal, part of the fat being replaced by at least one water-soluble humectant, particularly a polyol or a mixture of polyols, preferably comprising a polyol less sweet than sucrose and/or a polyol which is substantially indigestible.

The invention will now be illustrated in the following Examples.

EXAMPLE I

A w/o emulsion of the following composition was prepared:

|  | % by weight |
|---|---|
| Shortening | 36 |
| Soybean oil | 3.6 |
| Emulsifier (monoglyceride) | 0.4 |
| Milk | 30 |
| Sucrose (crystal sugar) | 30 |

The shortening consisted of soybean oil: 17%; palm oil 20%; soybean oil (m.p. 36° C.) 13%; fish oil (m.p. 39° C.) 50%.

The fat solids profile was:
$N_{5-15} = 49$; $N_{20} = 29$; $N_{30} = 10$; $N_{35} = 3.6$.

The N-values were measured according to J. Am. Oil Chemist's Society, Vol. 51 (1974), p. 316.

The emulsion was prepared by first dissolving the sugar in milk and subsequently emulsifying the syrup thus obtained in the mixture of fat/oil and emulsifier.

A cake was produced, starting from the following cake batter formulation:

|  | Parts by weight |
|---|---|
| Flour | 100 |
| Emulsion | 100 |
| Sucrose (crystal sugar) | 100 |
| Egg | 100 |
| Salt | 2 |
| Baking powder | 2 |

The cake was prepared as follows:

The emulsion was mixed (aerated) with the sugar for 10 minutes in a Hobart mixer to obtain a cream with a specific volume SV (ml/g) = 1.28. The eggs were added slowly to the cream while stirring and subsequently the flour was added while stirring for about 30 seconds.

Baking was carried out at 160° C. The cake obtained had a specific volume SV = 2.88. The structure of the cake was light with a slight coarse crumb. The cake was well cooked, had good organoleptic properties. On consumption the cake was not considered significantly drier than standard fat cake, i.e. a cake produced from 100 parts by weight of margarine instead of 100 parts of the emulsion.

EXAMPLE II

An emulsion of the following composition was prepared and texturized in a Votator$^R$ equipment.

|  | % by weight |
|---|---|
| Shortening | 36.0 |
| Soybean oil | 3.6 |
| Emulsifier (monoglyceride) | 0.4 |
| Milk | 30.0 |
| Glycerol | 30.0 |

The shortening consisted of the same fats as in Example I.

The procedure of Example I was followed for producing cake batter and cake except that this time the emulsion contained glycerol instead of sugar.

The cream produced has an S.V. = 1.18
The cake produced had an S.V. = 2.72

The structure of the cake was very much like that of Example I and had good organoleptic properties, comparable to those of a cake produced using the standard recipe with margarine alone instead of the emulsion containing glycerol.

EXAMPLE III

An emulsion of the following composition was prepared:

|  | % by weight |
|---|---|
| Shortening | 36.0 |
| Soybean oil | 3.6 |
| Emulsifier (monoglyceride) | 0.4 |
| Milk | 30.0 |
| Sorbitol | 30.0 |

The shortening consisted of the same fat blend as in Example I.

The procedure of Example I was followed for producing cake batter and cake except that this time an emulsion was used which contained sorbitol instead of sugar.

The S.V. of the cream was 1.01.
The S.V. of the cake was 2.77.

The structure and organoleptic properties of the cake were very similar to those of Example I and were comparable to those of a cake produced using the standard recipe with shortening/oil alone instead of the emulsion.

EXAMPLE IV

Example I was repeated except that in the emulsion 24% sucrose and 6% polydextrose were used. The results were not significantly different from those obtained in Example I.

EXAMPLE V

Example I was repeated except that the emulsion contained 15% sucrose and 15% lactose.

The results were not significantly different from those obtained in Example I, except that the colour of the cake was darker than in the previous Examples.

COMPARATIVE EXAMPLES

A series of experiments were carried out using, instead of the emulsions according to the invention, commercially available, reduced fat spreads (w/o) having the same level of fat as that of the emulsion according to the invention but which did not contain a humectant as defined in the present application.

The cakes obtained with said commercial product displayed an S.V. ranging from 1.8-2.3, which values were well below those obtained with the emulsions according to the invention, which were approx. 2.7.

Moreover, cakes produced with commercially available reduced fat w/o emulsion spreads were partly uncooked when baked under the same conditions as those produced with the emulsions according to the invention.

EXAMPLE VI

A w/o emulsion of the following composition was prepared by emulsifying the aqueous phase in the fat phase.

|  | % by weight |
| --- | --- |
| Fat phase | |
| Shortening | 39.6 |
| Monoglyceride | 0.2 |
| Lecithin | 0.2 |
|  | 40.0 |
| Aqueous phase | |
| Glycerol | 20 |
| Polydextrose | 10 |
| K-sorbate | 0.13 |
| Skimmed milk powder | 1.00 |
| Water acidified with lactic acid to pH 4.7 | 28.87 |

The shortening consisted of a fat blend as described in Example 1.

The specific volume of cakes produced from the above emulsion is described in Example I. The cakes were well cooked.

EXAMPLE VII

A w/o emulsion was produced according to the procedure of Example VI, except that a polyol mixture consisting of sucrose (15%), glycerol (10%) and polydextrose (5%) was used as the polyol ingredients used in the aqueous phase.

The specific volume of the cakes produced from this emulsion was 2.7. The cakes were well cooked.

We claim:

1. A bakery product comprising the following ingredients:
   (i) an edible water-in-oil emulsion to serve as a shortening comprising 15-70% of a fat phase containing a fat displaying the following fat solids profile expressed in percentages at the indicated temperatures:

$N_{5-15°C.}=30-70$; $N_{20°C.}=15-35$; $N_{30°C.}=2-16$; $N_{35°C.}=0-10$, the balance up to 100% consisting of an aqueous phase containing 5-60% by weight, based on the total emulsion, of a water-dissolved humectant comprising at least one polyol; and
   (ii) an effective amount to form said bakery product of a component selected from the group consisting of flour, eggs, leavening agent, sugar and mixtures thereof.

2. The bakery product according to claim 1, wherein the emulsion comprises a polyol selected from the group consisting of glucose, fructose, mannose, galactose, talose, lactose, sucrose, maltose, maltodextrins, glycerol, sorbitol, polydextrose, propylene glycol.

3. The bakery product according to claim 1, wherein the emulsion comprises a polyol less sweet than sucrose.

4. The bakery product according to claim 3, wherein the emulsion comprises glycerol or sorbitol.

5. The bakery product according to claim 1, wherein the emulsion comprises a substantially indigestible polyol.

6. The bakery product according to claim 5, wherein the emulsion comprises polydextrose.

7. The bakery product according to claim 6, wherein the emulsion comprises a mixture of polydextrose and another polyol wherein the amount of polydextrose is less than 35% by weight of the mixture.

8. The bakery product according to claim 1, wherein the emulsion comprises sucrose in an amount not exceeding 35% by weight, based on the total emulsion.

9. The bakery product according to claim 1, wherein the emulsion comprises 10-55% by weight of humectant and 25-65% by weight of fat.

10. The bakery product according to claim 9, wherein the emulsion comprises 15-40% by weight of humectant and 30-45% by weight of fat.

11. The bakery product according to claim 1 wherein the ratio fat:humectant ranges from 0.4 to 7.

12. The bakery product according to claim 11, wherein the ratio fat:humectant ranges from 0.7 to 3.

13. The bakery product according to claim 1, wherein the fat phase contains up to 40% of an oil substantially free from crystalized fat at 10° C., the remainder of the fat consisting of fats melting within the range of 24°-54° C.

14. The bakery product according to claim 13, wherein the emulsion comprises an emulsifier selected from the group consisting of a monoglyceride, a diglyceride, lecithin and mixtures thereof.

* * * * *